United States Patent
Morris

(10) Patent No.: US 10,261,210 B2
(45) Date of Patent: Apr. 16, 2019

(54) METHOD AND APPARATUS FOR ACTIVE SUPPRESSION OF PIPE SIGNALS IN TRANSIENT ELECTROMAGNETIC MEASUREMENTS

(71) Applicant: Steven Allen Morris, Spring, TX (US)

(72) Inventor: Steven Allen Morris, Spring, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 302 days.

(21) Appl. No.: 15/064,684

(22) Filed: Mar. 9, 2016

(65) Prior Publication Data

US 2017/0261633 A1 Sep. 14, 2017

(51) Int. Cl.
*G01V 3/30* (2006.01)
*E21B 44/00* (2006.01)
*E21B 49/00* (2006.01)
*E21B 47/12* (2012.01)
(Continued)

(52) U.S. Cl.
CPC ............ *G01V 3/30* (2013.01); *E21B 44/00* (2013.01); *E21B 49/00* (2013.01); *E21B 7/04* (2013.01); *E21B 47/024* (2013.01); *E21B 47/12* (2013.01)

(58) Field of Classification Search
CPC .......... G01V 3/30; E21B 44/00; E21B 49/00; E21B 7/04
See application file for complete search history.

(56) References Cited

U.S. PATENT DOCUMENTS

| | | | |
|---|---|---|---|
| 5,581,024 A | 12/1996 | Meyer, Jr. et al. | |
| 5,883,515 A * | 3/1999 | Strack | G01V 3/20 324/339 |
| 5,892,361 A | 4/1999 | Meyer et al. | |

(Continued)

FOREIGN PATENT DOCUMENTS

WO 2012109433 A2 8/2012

OTHER PUBLICATIONS

"Oilfield Bucking Units", Weatherford, Tubular Running Services, [Retrieved from the Internet, Jun. 21, 2017] www.weatherford.com/doc/wft130408; 3 pages.

(Continued)

*Primary Examiner* — Mohamed Charioui
(74) *Attorney, Agent, or Firm* — Cantor Colburn LLP

(57) ABSTRACT

Methods and systems for estimating properties of formations including conveying a carrier through a borehole having a first transmitter, a second transmitter collocated with the first transmitter, a first receiver, and a second receiver, the first receiver positioned a first distance from the first transmitter and the second receiver positioned a second distance therefrom, generating a transient electromagnetic field with the first transmitter, generating a suppression signal with the second transmitter, the suppression signal configured to suppress a response received by the first and second receivers that is caused by the transient electromagnetic field interacting with the carrier, measuring a signal with suppressed pipe signal at the first and second receivers, the measured signal representing the formation response to the transient electromagnetic field, estimating a formation property from the measured signal to select a model, and adjusting a drilling operation based on the estimated property of the formation.

21 Claims, 12 Drawing Sheets

(51) Int. Cl.
*E21B 7/04* (2006.01)
*E21B 47/024* (2006.01)

(56) References Cited

U.S. PATENT DOCUMENTS

| | | | |
|---|---|---|---|
| 6,204,667 B1 | 3/2001 | Won | |
| 6,288,548 B1 | 9/2001 | Thompson et al. | |
| 6,586,939 B1 | 7/2003 | Fanini et al. | |
| 6,765,385 B2 | 7/2004 | Sinclair et al. | |
| 6,891,376 B2 | 5/2005 | Hanstein et al. | |
| 7,301,429 B1 | 11/2007 | Hall et al. | |
| 7,408,355 B1 | 8/2008 | Forgang et al. | |
| 7,598,741 B2 | 10/2009 | Fanini et al. | |
| 7,994,790 B2 | 8/2011 | Itskovich et al. | |
| 8,030,935 B2 | 10/2011 | Xiao et al. | |
| 8,332,152 B2 | 12/2012 | Itskovich et al. | |
| 8,762,107 B2 | 6/2014 | Pelegri et al. | |
| 9,310,511 B2 | 4/2016 | Itskovich | |
| 9,857,499 B2 | 1/2018 | Itskovich | |
| 2004/0183538 A1* | 9/2004 | Hanstein | G01V 3/28 324/339 |
| 2005/0049791 A1 | 3/2005 | Besplav et al. | |
| 2005/0093547 A1* | 5/2005 | Xiao | G01V 3/28 324/339 |
| 2005/0140374 A1 | 6/2005 | Itskovich | |
| 2006/0192562 A1* | 8/2006 | Davydychev | G01V 3/28 324/339 |
| 2007/0216416 A1 | 9/2007 | Itskovich | |
| 2008/0270032 A1 | 10/2008 | Nikitenko et al. | |
| 2009/0114009 A1 | 5/2009 | Thambynayagam et al. | |
| 2009/0240435 A1 | 9/2009 | Itskovich et al. | |
| 2009/0243618 A1 | 10/2009 | Wang et al. | |
| 2010/0097065 A1 | 4/2010 | Itskovich et al. | |
| 2010/0109905 A1 | 5/2010 | Itskovich et al. | |
| 2010/0171501 A1 | 7/2010 | Alumbaugh et al. | |
| 2011/0227578 A1* | 9/2011 | Hall | G01V 3/28 324/343 |
| 2014/0121974 A1 | 5/2014 | Itskovich | |
| 2014/0207379 A1 | 7/2014 | Björnemo | |
| 2015/0115965 A1* | 4/2015 | Reiderman | G01V 3/10 324/339 |
| 2015/0241592 A1 | 8/2015 | Itskovich et al. | |
| 2017/0235012 A1 | 8/2017 | Itskovich et al. | |
| 2017/0261635 A1 | 9/2017 | Morris | |
| 2017/0261636 A1 | 9/2017 | Morris | |

OTHER PUBLICATIONS

International Search Report for International Application No. PCT/US2017/021323 dated Jun. 9, 2017 (3 pp.).

Wtitten Opinion of the International Searching Authority for International Application No. PCT/US2017/021323 dated Jun. 9, 2017 (5 pp.).

* cited by examiner

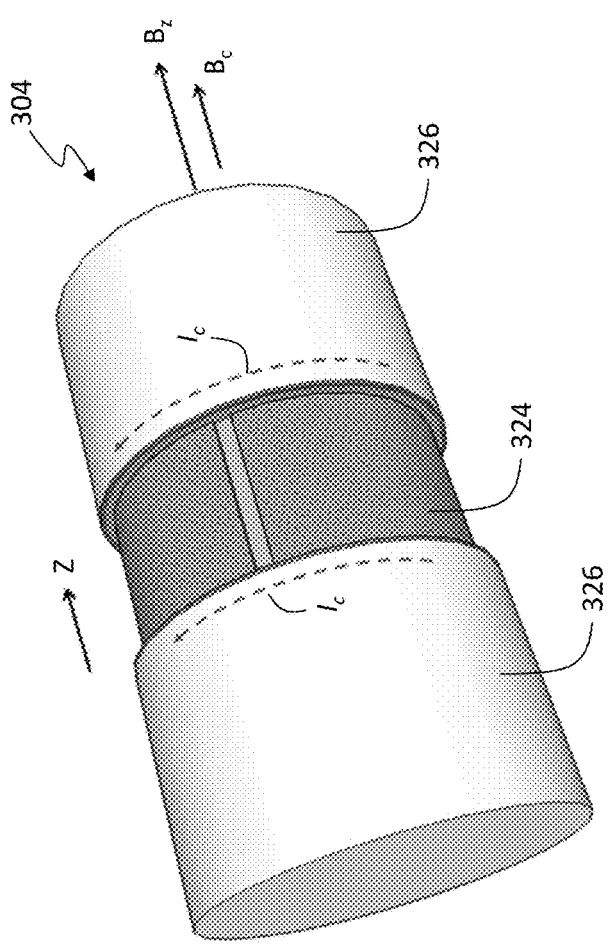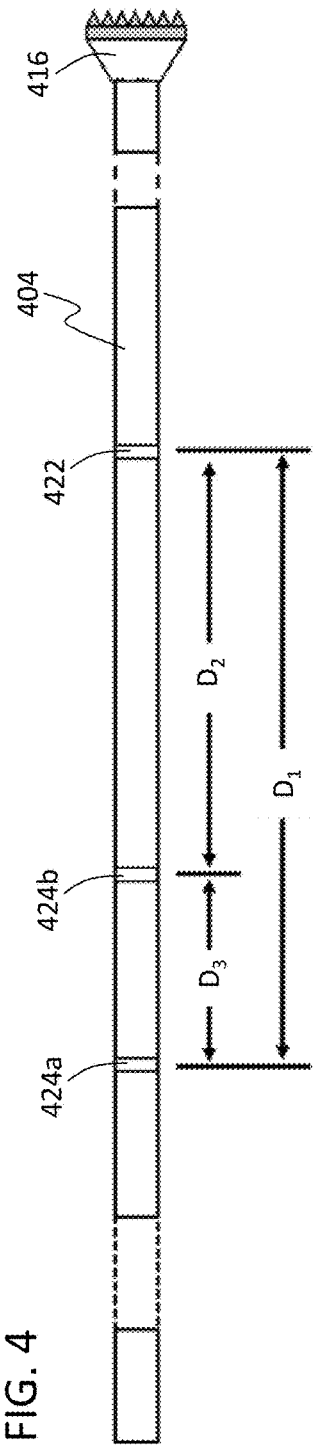
FIG. 3
FIG. 4

US 10,261,210 B2

METHOD AND APPARATUS FOR ACTIVE SUPPRESSION OF PIPE SIGNALS IN TRANSIENT ELECTROMAGNETIC MEASUREMENTS

BACKGROUND

The ultimate objective of any geophysical experiment is to find properties of a formation using the measured data. To accomplish the objective a processing technique, called inversion, is applied. Inversion requires a mathematical model, which is used to produce synthetic data. The model has to include all of the necessary parameters that affect the measurements because an accurate model is needed for a successful inversion. Because the amount of recordable data is limited, no geophysical inverse problem is uniquely solvable and inferences of formation properties are statistical.

The possibility to reduce the range of uncertainty in the inverted models is driven by the sensitivity of the data to parameters of interest and a level of noise in the data. The noise can be either random or systematic. Because of this, mechanisms for improving sensitivity to the parameters of a formation have been developed. For example, a technique referred to as bucking was developed to improve sensitivity to the parameters of the formation while eliminating systematic noise caused by a primary field and/or the conductive tools used to make the measurements. If bucking does not account for electromagnetic interference between a conductive tool body and a formation, this interference will create or be a source of additional systematic noise. For this reason, it is beneficial to develop techniques for reducing inconsistency between measured and synthetic model responses and thus reduce uncertainty in estimated parameters of a formation.

SUMMARY

A method for estimating a property of an earth formation penetrated by a borehole, the method comprising conveying a carrier through a borehole, the carrier having a first transmitter, a second transmitter collocated with the first transmitter, a first receiver, and a second receiver, the first receiver being positioned at a first distance from the first transmitter and the second receiver being positioned at a second distance from the first transmitter, generating a transient electromagnetic field with the first transmitter, generating a suppression signal with the second transmitter, the suppression signal configured to suppress a response received by the first receiver and the second receiver that is caused by the transient electromagnetic field interacting with the carrier, measuring a signal with suppressed pipe signal at the first receiver and signal with suppressed pipe signal at the second receiver, the measured signal representing the formation response to the transient electromagnetic field; estimating a formation property from the measured signal to select a model of the formation; and adjusting a drilling operation based on the estimated property of the formation.

A system for estimating a property of an earth formation penetrated by a borehole, the system comprising a carrier configured to be conveyed through a borehole, a first transmitter disposed on the carrier and configured to transmit transient electromagnetic fields, a second transmitter disposed on the carrier and configured to transmit suppression signals, a first receiver disposed on the carrier a first distance from the first transmitter and configured to receive signals from the first transmitter and the second transmitter, a second receiver disposed on the carrier a second distance from the first transmitter and configured to receive signals from the first transmitter, and a processor configured to estimate a property of the formation. The system configured to generate a transient electromagnetic field with the first transmitter, generate a suppression signal with the second transmitter, the suppression signal configured to suppress a response received by the first receiver and the second receiver that is caused by the transient electromagnetic field interacting with the carrier, measure a signal with suppressed pipe signal at the first receiver and signal with suppressed pipe signal at the second receiver, the measured signal representing the formation response to the transient electromagnetic field, and estimate a formation property from the measured signal to select a model of the formation.

BRIEF DESCRIPTION OF THE DRAWINGS

The following descriptions should not be considered limiting in any way. With reference to the accompanying drawings, like elements are numbered alike:

FIG. 3 is a schematic illustration of a portion of a carrier in accordance with an embodiment of the present disclosure;

FIG. 4 is a schematic illustration of a carrier having a drill bit configured in accordance with an embodiment of the present disclosure;

The detailed description explains embodiments of the present disclosure, together with advantages and features, by way of example with reference to the drawings.

DETAILED DESCRIPTION

A detailed description of one or more embodiments of the disclosed apparatuses and methods presented herein are presented by way of exemplification and not limitation, with reference made to the appended figures.

Disclosed are methods and systems for measuring pipe signals during transient electromagnetic measurements. Using a transient electromagnetic tool with a single transmitter and two receivers, signals at the two receivers are bucked to eliminate a formation response and thus a pipe response may be extracted. Currently, a pipe response measurement is used for signal processing of transient electromagnetic signals. Current methods to measure pipe response may use an air-hang test, which may be expensive and difficult to conduct for transient electromagnetic tools. As provided herein, methods and processes in accordance with embodiments of the present disclosure enabled easier and/or more efficient pipe signal measurements for air-hang tests. For example, embodiments provided herein may eliminate the need to suspend a tool with a crane. Further, various embodiments provided herein enable measurement of the pipe signal in situ and thus changes in a pipe signal caused by pipe bending, temperature induced changes in pipe conductivity, etc. can be tracked.

Figure 1:
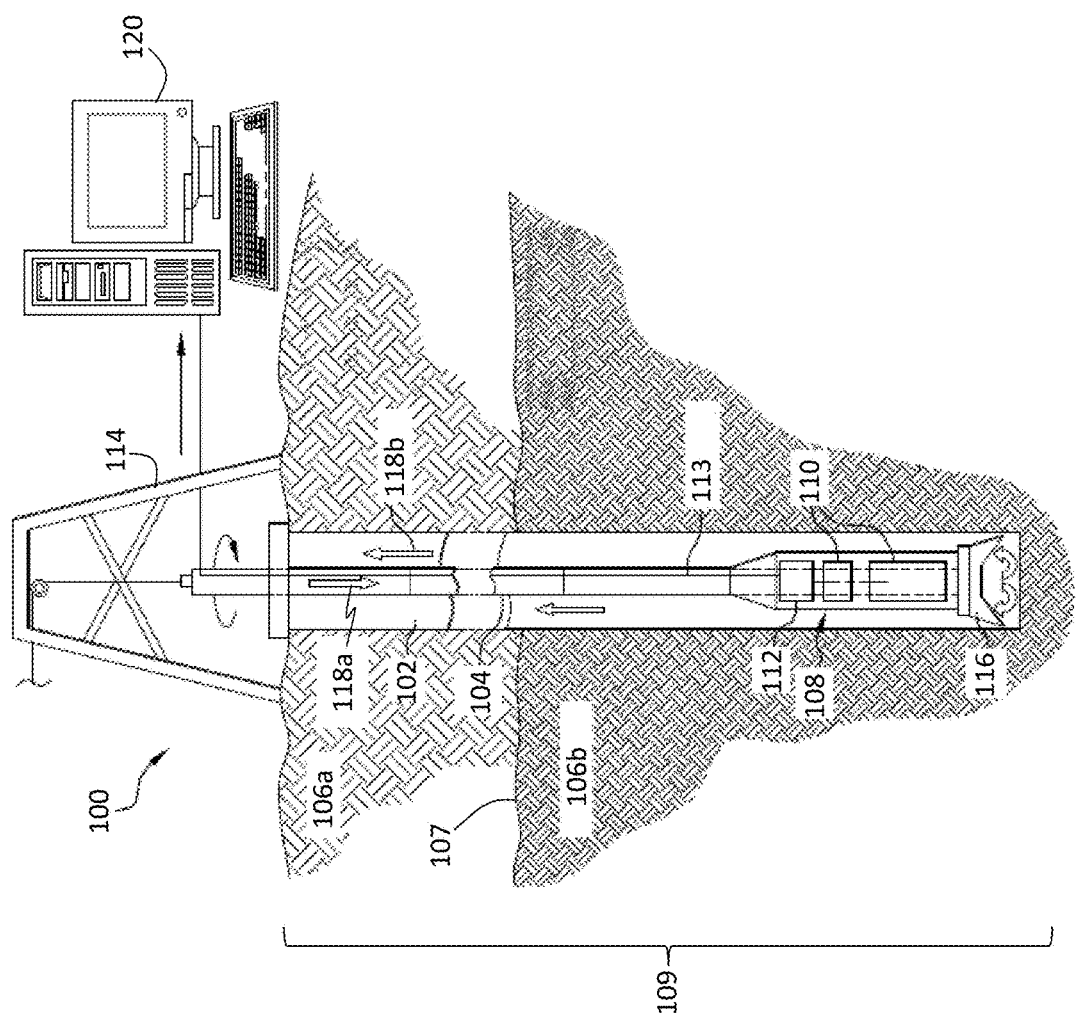
FIG. 1 is a cross-sectional view of an embodiment of a downhole drilling, monitoring, evaluation, exploration and/or production system in accordance with an embodiment of the present disclosure.

Referring to FIG. 1, a non-limiting schematic illustration of a downhole drilling, monitoring, evaluation, exploration, and/or production system 100 associated with a borehole 102 is shown. A carrier 104 is run in the borehole 102, which penetrates one or more earth formations 106a, 106b for facilitating operations such as drilling, extracting matter from the formation, sequestering fluids such as carbon dioxide, and/or making measurements of properties of the formations 106a, 106b, a formation interface 107 (i.e., the interface between the formations 106a, 106b), and/or the borehole 102 downhole. The carrier 104 includes any of various components to facilitate subterranean operations. In various embodiments, the carrier 104 is constructed of, for example, a pipe, multiple pipe sections, flexible tubing, or other structures. In other configurations, the carrier 104 is constructed of an armored wireline, such as that used in wireline logging. The carrier 104 is configured to include, for example, a drilling system and/or a bottom-hole assembly (BHA) on a downhole end thereof.

The system 100 and/or the carrier 104 may include any number of downhole tools 108 for various processes including drilling, hydrocarbon production, and formation evaluation for measuring one or more physical properties, characteristics, quantities, etc. in and/or around the borehole 102. For example, in some embodiments, the downhole tools 108 include a drilling assembly and/or a pumping assembly. Various measurement tools can be incorporated into the system 100 to affect measurement regimes such as wireline measurement applications, measurement-while-drilling (MWD), and/or logging-while-drilling (LWD) applications.

While the system 100 may operate in any subsurface environment, FIG. 1 shows the downhole tools 108 disposed in the borehole 102 penetrating the earth 109 (including a first formation 106a and a second formation 106b). The downhole tools 108 are disposed in the borehole 102 at a distal end of the carrier 104. As shown, the downhole tools 108 include measurement tools 110 and downhole electronics 112 configured to perform one or more types of measurements in LWD or MWD applications and/or operations. In a LWD or MWD configuration, the carrier 104 is a drill string. The measurements may include measurements related to drill string operation, for example.

A drilling rig 114 is configured to conduct drilling operations such as rotating the carrier 104 (e.g., a drill string) and, thus, a drill bit 116 located on the distal end of the carrier 104. As shown, the drilling rig 114 is configured to pump drilling fluid 118a through the carrier 104 in order to lubricate the drill bit 116. The drilling fluid 118a becomes a flushing fluid 118b to flush cuttings from the borehole 102.

The downhole electronics 112 are configured to generate data, i.e., collect data, at the downhole tools 108. Raw data and/or information processed by the downhole electronics 112 may be telemetered along telemetry 113 to the surface for additional processing or display by a computing system 120. In some configurations, drilling control signals are generated by the computing system 120 and conveyed downhole to the downhole tools 108 or, in alternative configurations, are generated within the downhole electronics 112 or by a combination thereof. The downhole electronics 112 and the computing system 120 may each include one or more processors and one or more memory devices.

Different layers or formations of the earth 109 may each have a unique resistivity. For example, the first formation 106a may have a first resistivity and the second formation 106b may have a second resistivity. Depending on the compositions of the first formation 106a and the second formation 106b, the first resistivity may be different from the second resistivity. In order to measure and/or detect these resistivities, and thus extract information regarding the formations 106a, 106b, and/or the interface 107 therebetween, the downhole tools 108 are configured to obtain electromagnetic information. Accordingly, the downhole tools 108 include one or more transmitters (transmitter coils) that turn a current impulse in a transmitter coil on and off to induce a current in the earth 109 (e.g., formations 106a, 106b). One or more receivers are configured to receive a resulting transient electromagnetic (TEM) signal. Those of skill in the art will appreciate that the transmitter(s) and receiver(s) may be one-, two-, or tri-axis devices, and/or other transceiver devices may be employed without departing from the scope of the present disclosure. In some embodiments, the transmitters may be configured with electromagnets and/or switchable permanent magnets to induce currents in the earth 109.

Figure 2:
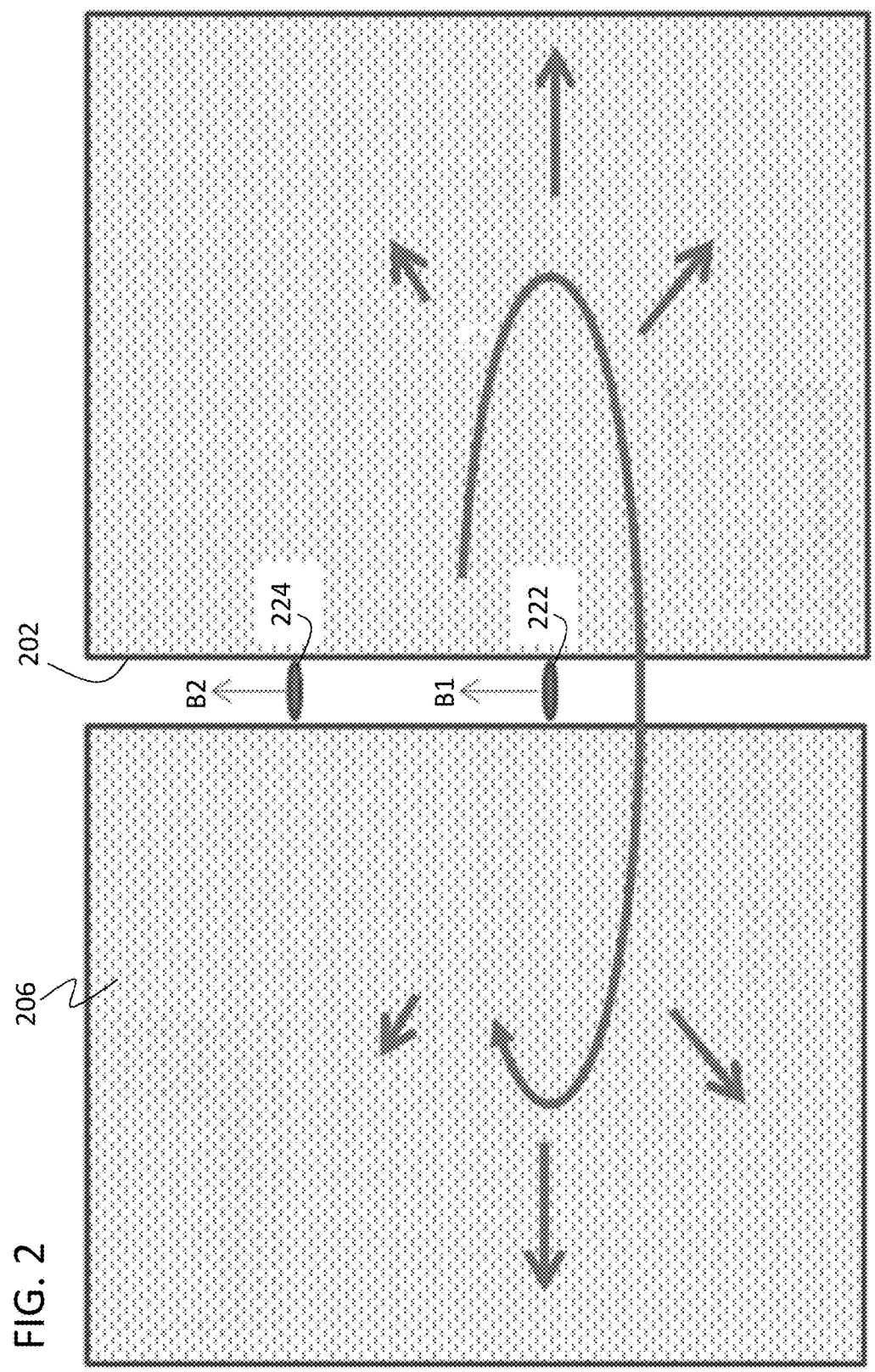
FIG. 2 is a schematic illustration of electric currents generated in a formation in accordance with an embodiment of the present disclosure.

Turning now to FIG. 2, a schematic illustration of a transient electromagnetic method of downhole geophysical measurement is shown. A formation 206 is shown having a borehole 202 formed therein. Components of a downhole tool are schematically shown as a transmitter 222 and a receiver 224. The transmitter 222 is configured to employ a fast reversing magnetic dipole, denoted as primary magnetic field B1 to induce currents in the formation 206. These currents diffuse outward away from the borehole 202, as schematically illustrated. The currents within the formation generate a secondary magnetic field B2. As configured, a derivative of the secondary magnetic field B2 is sensed by the receiver 224. Accordingly, a measurement obtained by the downhole tool, e.g., receiver 224, consists of transient voltages generated in coils of the receiver 224. Inversion of geophysical data (e.g., the measured magnetic field at the receiver 224) enables making inferences about properties of the formation 206 from the acquired data. Mathematically, the inferences involve a process of finding a model that provides a best-fit between the measurements and synthetic data, wherein the synthetic data is data configured to remove known uncertainties.

For example, the fast reversing magnetic dipole of the transmitter 222 may induce currents in the carrier that supports and carries the downhole tools including the transmitter 222 and the receiver 224 (e.g., as shown in FIG. 1), which increases the uncertainty in the model fitting. For example, when an electrically conductive structural member forms part of the carrier (e.g., a drill string), uncertainty in signals can arise. In one non-limiting example, a drill collar is configured to carry a transient electromagnetic apparatus (e.g., the electromagnetic apparatus includes the transmitter 222 and the receiver 224).

As shown in FIG. 3, an illustration of the interaction of transmitted magnetic field and magnetic field from currents induced in the carrier 304 during a transient measurement are shown. In the configuration of FIG. 3, a transmitter (not shown) is oriented in the axial direction, designated as a Z direction. A receiver 324 is configured as a coil (not shown) wound circumferentially around a cylindrical magnetically permeable core mounted in a recess of the carrier 304, such as a conductive metallic mandrel 326 of a downhole tool. At the beginning of a transient measurement, the transmitter, located a predetermined distance away in the Z direction, may produce a step Bz in magnetic field along the axis of the receiver 324 (e.g., along the Z direction of the receiver 324). The magnetic core of the receiver 324 shields the carrier 304 from the step Bz in magnetic field, but at the edges of the magnetic core of the receiver 324 a circumferential current Ic may be induced in the metallic mandrel 326 of the carrier 304. In accordance with Lenz's Law the induced circumferential current Ic will produce a magnetic field Bc that opposes the transmitter induced step Bz in magnetic field.

Accordingly, a summation of the transmitter magnetic field (e.g., Bz) and carrier current induced magnetic field (e.g., Bc) produces a total axial magnetic field in the vicinity of the receiver 324 that is modified from the transmitted step Bz. The total magnetic field (e.g., measurement) consists of a step from the transmitter and an opposing magnetic field from the carrier currents, which have a magnitude that decreases with time. Accordingly, a total sum and a secondary field that is induced by the sum in the formation can be measured.

This additional magnetic field can result in measurements that deviate from a desired measurement. That is, the additional magnetic field alters measured results and thus impacts models that are desired to determine a structure, composition, and/or other characteristic of one or more formations in the earth. As time passes during measurements, the cumulative effect of the carrier field Bc causes formation response to diverge significantly from formation response to step Bz without the carrier field. Synthetic responses generated during inversion for comparison to measured response are based only on response to a transmitter step Bz. Because of this, deviation of response to step Bz caused by carrier field Bc will produce errors in the inversion. Also, while the magnetic field from carrier currents affects a formation response, it may also dominate a signal measured in the receiver, effectively masking a formation response during the measurement.

Referring to FIG. 4, a schematic illustration of a carrier 404 configured to account for a carrier induced signal is shown. The carrier 404 is configured to perform an operation referred to as bucking, wherein a carrier induced signal is detected and then suppressed from a total signal to thus extract out a formation signal. As shown, the carrier 404 is configured with a bit 416 disposed on a distal end of the carrier 404. A transmitter 422 is located on the carrier 404 and a first, or main, receiver 424a is located on the carrier 404 at a first distance D1 from the transmitter 422. A second, or bucking, receiver 424b is located on the carrier 404 at a second distance D2 from the transmitter 422. The carrier induced signal is suppressed by using the two receivers 424a, 424b which are spaced apart by a third distance D3 (i.e., the difference between distances D1 and D2). The signal induced in the receivers 424a, 424b by carrier currents is proportional to the cube of the distance between the specific receiver 424a, 424b and the transmitter 422, while a formation signal is almost equal in each receiver 424a, 424b. This allows the carrier signal to be bucked out (e.g., eliminated and/or accounted for) and the measured formation signal is extracted. As shown, the bucking receiver (second receiver 424b) is shown as closer to the transmitter 422 than the main receiver (first receiver 424a). This configuration is merely provided for illustrative purposes and is not intended to be limiting.

The bucking process is used to reduce uncertainty in measured data. However, other sources of uncertainty exist, such that additional techniques are desirable. In addition to the bucking technique, synthetic data may be used to reduce the uncertainty of measurements, thus enabling better modeling and/or fits to models. The synthetic data is data that represents certain characteristics or components of a signal which are then accounted for in processing of measured real-world data, such that the output is an accurate reflection of the characteristics, features, and/or properties of the formation located in the earth. For example, if real-world data (e.g., measurements) are affected by a conductivity of a carrier in a downhole operation, the synthetic data have to be affected by the carrier as well. As provided herein, methods and processes for providing a basic measurement of a formation response by bucking out a pipe response are provided.

Problems may arise with transient measurements in the presence of pipe signals. For example, a pipe signal may affect a transient electromagnetic measurement in two ways. First, the pipe signal can produce a formation response that varies significantly from the response of the formation to the transmitter's dipole step reversal. Second, the receiver voltages consist of the formation responses convolved with the pipe signal, so the receiver voltages can be dominated by the pipe signal.

Further, problems may arise with respect to formation model inversion. For example, the first item listed above can cause problems with inversion routines used to produce an earth model from a measured signal. In an inversion scheme, an earth model is proposed and a curve of the formation response is generated using forward modeling software. The model curve is compared to the measured curve and a search algorithm is employed to vary the earth model parameters and iterate until the model curve approximately matches the measured response. Under current schemes, the forward modeling software does not account for the effect of the pipe signal on the formation response, so the inversion routine may fail to converge or may produce an erroneous model.

Moreover, problems may arise with respect to dynamic range and bucking coefficient estimation. The second item, discussed above, causes dynamic range problems when extracting the formation signal through bucking.

Figure 5:
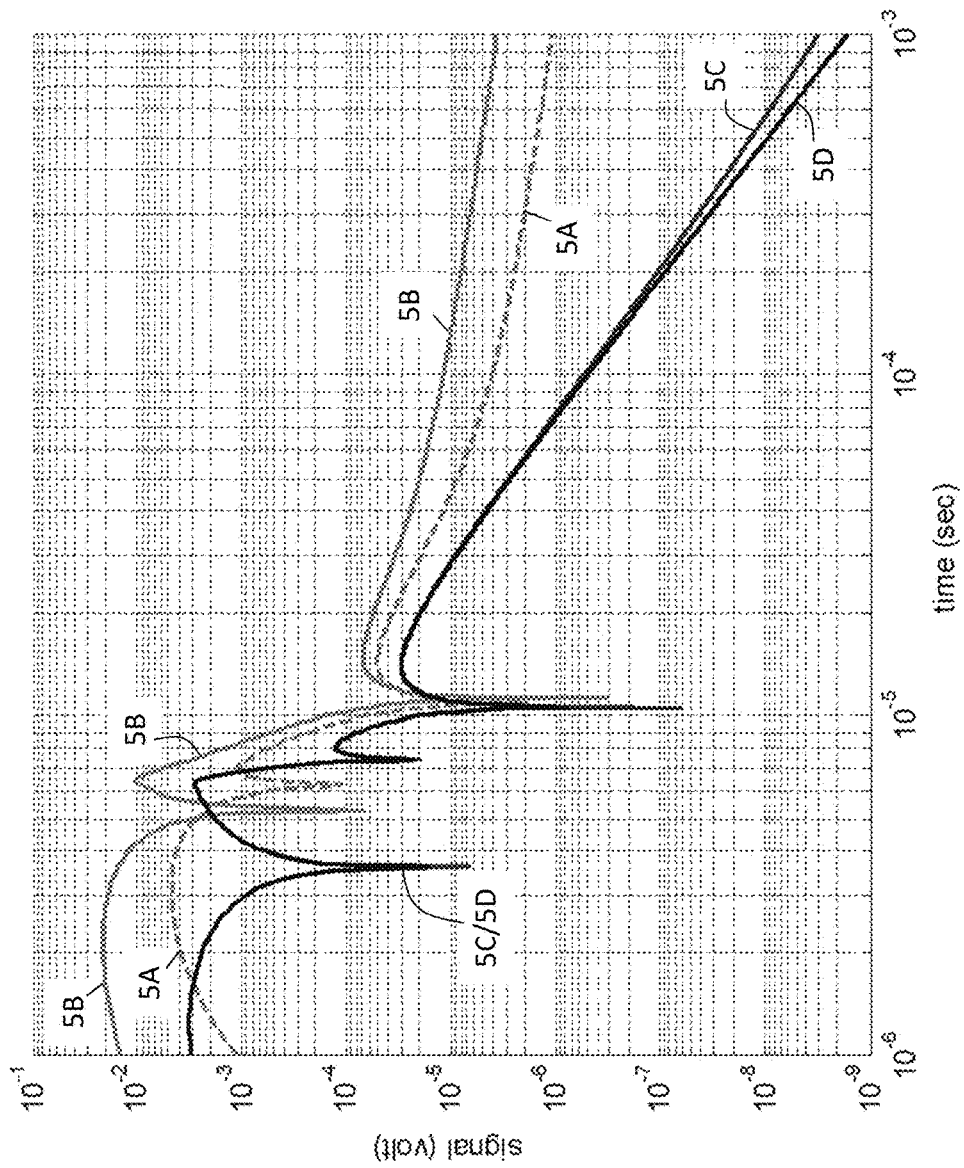
FIG. 5 is a schematic plot of signals as a function of time demonstrating that a response is dominated by a pipe signal.

For example, as shown in FIG. 5, the received signals in the coils are dominated by the pipe signal. In FIG. 5, curve 5A is the main coil signal, curve 5B is the bucking coil signal, curve 5C is the bucked signal (with pipe), and curve 5D is a no-pipe signal (e.g., formation only). The bucking calculation requires that two large numbers (e.g., curves 5A, 5B) be subtracted to produce the small formation signal (e.g., curve 5D). While this is generally practical to do when the received signals are up to ten times the extracted signal, it becomes increasingly difficult as the received signals approach one hundred to one thousand times the extracted signal. Any error in the estimation of the bucking coefficient can produce large errors in the extracted signal. One solution to alleviate this is by lengthening the sensors and employing copper shields to reduce the pipe signal, but mechanical constraints in LWD tool design can severely limit such a solution. Best sensor designs result in about a 100:1 ratio of received signal to extracted formation signal at the 200 to 300 microsecond limit of the measurement.

As will be appreciated by those of skill in the art, and described above, a formation has a resistivity associated therewith. The resistivity of the formation enables measurements of magnetic fields such that data may be generated that are representative of the formation. This data is then used to find a best-fit model, and thus an estimation of the physical characteristics and/or make-up of the formation may be made. Further, as noted above, a carrier, particularly a metallic carrier, introduces uncertainty when fitting a model to the data. One source of such uncertainty is a magnetic field induced by the carrier itself, as described above, and can be accounted for using a bucking process.

However, both problems discussed above can be alleviated by using active suppression of the pipe signal. This technique uses an auxiliary coil at the transmitter to produce a time varying B-field that cancels the effect of the pipe signal. For example, an auxiliary coil can be configured on or about the transmitter 422 shown in FIG. 4.

Figure 6:
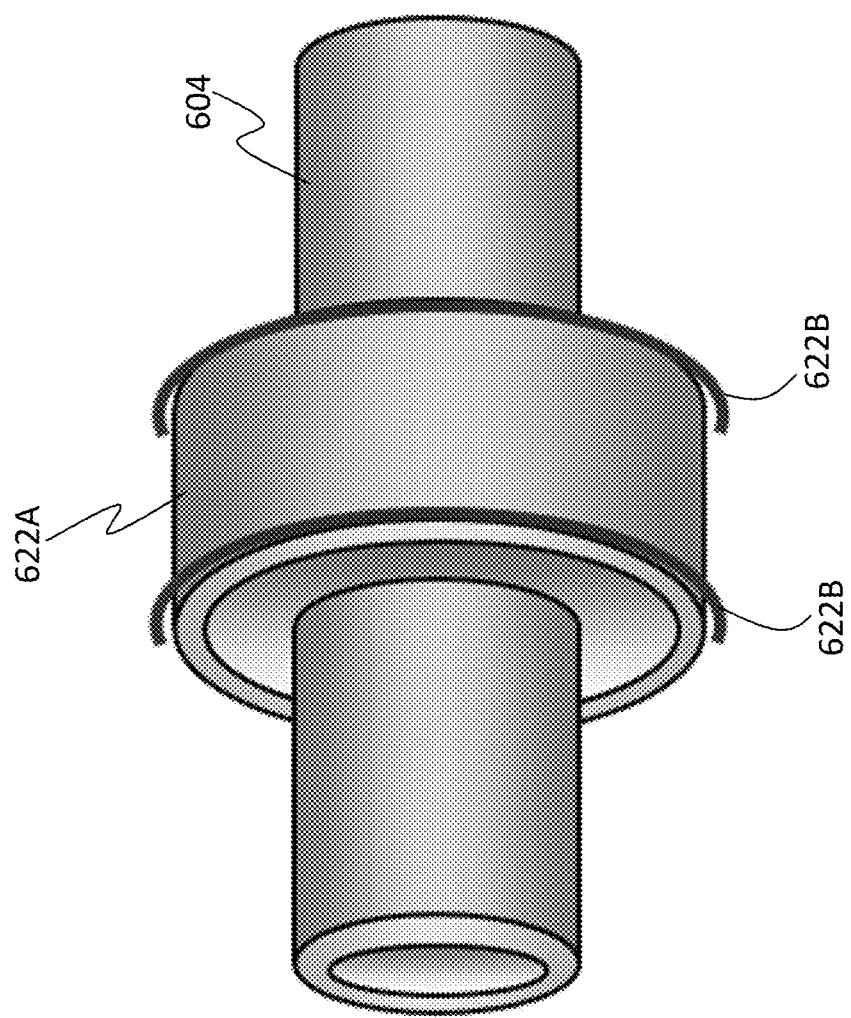
FIG. 6 is a schematic illustration of a carrier having a primary and an auxiliary coil transmitter configured thereon in accordance with an embodiment of the present disclosure.

An example of a dual-transmitter (e.g., main and auxiliary) configuration is schematically illustrated in FIG. 6. As shown, a carrier 604 is configured with a first transmitter 622A thereon, which may be configured in a system similar to that shown in FIG. 4. Further, located at the same location, and wrapped around the first transmitter 622A, is a second transmitter 622B. The first transmitter 622A and the second transmitter 622B are configured to be separately controlled such that two different signals or transmissions can be generated therefrom. For example, the first transmitter 622A can be driven to generate a first or main signal within a formation and/or along the carrier 604. Further, the second transmitter 622B can be driven to generate a second or suppression signal that is configured to minimize, suppress, and/or cancel a pipe signal.

In one non-limiting embodiment, the first or main transmitter 622A is configured as a switchable magnet that is configured to produce step transitions. Accordingly, the second or auxiliary transmitter 622B is configured wound about the first transmitter 622A and produces a time varying field. In another non-limiting embodiment, the first transmitter 622A and the second transmitter 622B are configured in a single electromagnet transmitter that is capable of time-varying fields through control of currents of the electromagnet. In such a configuration an auxiliary (or suppression) signal can be generated by adding a specific current to the electromagnet transmitter. In some embodiments, the second transmitter 622A can be collocated with the first transmitter 622B. Further, in some embodiments, the first and second transmitters can be independently controllable.

The receivers of the system (as described above) will then measure a pipe-suppressed signal that is a combination of the main signal and the suppression signal. The pipe-suppressed signal will be a signal that is only a signal or response generated by a formation, and thus an accurate estimation and/or approximation of formation properties can be determined. That is, from the pipe-suppressed signal, using inversion, a geological model may be found whose synthetic response matches the formation signal well. From this, an operator may make informed decisions based on in situ measurements and estimations of formation properties that are made without a pipe signal affecting the measurements and/or estimations.

In accordance with embodiments provided herein, two pipe signals P1 and P2, detected at first and second receivers respectively, are the receiver responses with no formation to a unit dipole step. The first receiver is positioned at a first distance $d_1$ from the transmitter and the second receiver is positioned at a second distance $d_2$ from the transmitter. The responses of the receivers are a combined response to the pipe currents adjacent to the transmitter and the local pipe currents adjacent to the respective receiver. There is some interaction of the receivers that produces a slight difference between $P_1$ and $P_2$. However, as appreciated by those of skill in the art, the difference may generally be ignored, and it may be assumed that the two pipe signals $P_1$ and $P_2$ are equal:

$$P_1(t)=P_2(t)=P(t) \quad\quad\quad \text{Eq. (1)}$$

Assuming M is a transmitter-receiver moment product, it is defined that a first voltage $V_1$ at the first receiver and a second voltage $V_2$ at the second receiver is:

$$V_1=M[\delta(t)+P(t)]*F_1(t) \quad\quad\quad \text{Eq. (2)}$$

$$V_2=M[\delta(t)+P(t)]*F_2(t) \quad\quad\quad \text{Eq. (3)}$$

As used above, $\delta(t)$ is unit impulse and is the receiver response to a unit step in magnetic field. Further, P(t) is a voltage response of the receiver due to pipe currents as defined above (i.e., Eq. (1) defines this term as equal or the same for both receivers). The responses ($M[\delta(t)+P(t)]$) are convolved (indicated as "*") with a receiver voltage response to the formation, $F_1(t)$ and $F_2(t)$, respectively.

Moreover, a bucking coefficient k can be defined as the cube of the ratio of the receiver to transmitter distances:

$$k = \left(\frac{d_2}{d_1}\right)^3 \quad\quad\quad \text{Eq. (4)}$$

Those of skill in the art will appreciate that the bucking coefficient can be obtained using other methods and/or processes. For example, in some non-limiting embodiments, the bucking coefficient may be obtained experimentally. Thus, the present disclosure is not limited to Eq. (4) for obtaining the bucking coefficient. Having the voltage for each receiver and knowing the bucking coefficient k a bucking calculation may be performed using the measured voltages, e.g., perform a bucking calculation using Eq. (2) and Eq. (3):

$$V_1-kV_2=M[F_1(t)-kF_2(t)]+MP*[F_1(t)-kF_2(t)] \quad\quad\quad \text{Eq. (5)}$$

As noted, the symbol denotes convolution. Equation (5) defines the measurement of the transient electromagnetic tool. The first term on the right side of Eq. (5) (e.g., $M[F_1(t)-kF_2(t)]$) is a bucked formation dipole response, while the second term (e.g., $MP*[F_1(t)-kF_2(t)]$) is a bucked formation pipe response. The bucked formation dipole response is a desired measurement and bucked formation pipe response is an error term. While the bucked formation pipe response is small compared to the dipole formation response, this response must be accounted for when performing inversion, particularly at late times in high resistivity formations.

In the following discussion, to simplify, the bucked dipole response will be represented as $F_{BU}$ and the bucked measured response as $V_{meas}$:

$$F_{BU} = M[F_1(t) - kF_2(t)] \quad \text{Eq. (6)}$$

$$V_{meas} = V_1 - kV_2 \quad \text{Eq. (7)}$$

Combining Eqs. (5), (6), and (7) yields:

$$V_{meas} = F_{BU} + P^*F_{BU} \quad \text{Eq. (8)}$$

Note that $V_{meas}$ is the measured tool bucked response, $F_{BU}$ is the bucked formation dipole response, and $P^*F_{BU}$ is the error term in the measurement that is desired to be eliminated.

Figure 7:
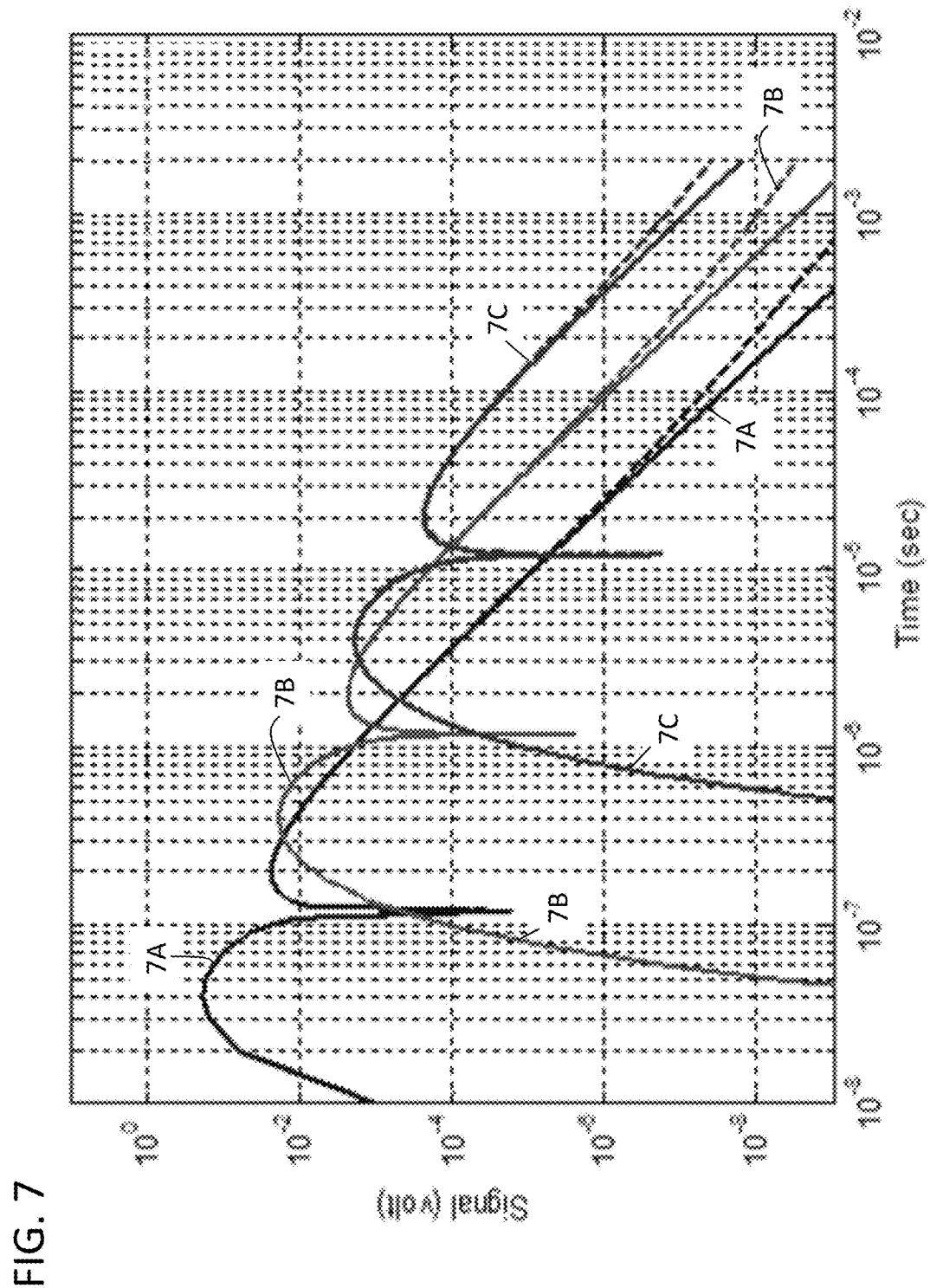
FIG. 7 is a illustrative plot showing measured curves according to equations of the present disclosure for various homogeneous formation resistivities.

FIG. 7 shows measured curves according to Eq. (8) for various homogeneous formation resistivities. In FIG. 7, curves 7A is a measured response for a homogeneous formation having a resistivity of 100 Ω-m; curves 7B is a measured response for a homogeneous formation having a resistivity of 10 Ω-m; and curve 7C is a measured response for a homogeneous formation having a resistivity of 1 Ω-m. The ideal bucked dipole responses, corresponding to the first term on the right side of Eq. (8), are shown as solid curves. The total measured curves are shown as dashed lines. The difference between ideal response and measured response corresponds to the error term of Eq. (8), i.e., $P^*F_{BU}$.

As noted above, embodiments provided herein employ one or more auxiliary coils at the transmitter to suppress the pipe signal. The suppression signal generated by the auxiliary transmitter has the effect of zeroing out the pipe signal P in the measurement enabled by Eq. (8), the eliminating the error term $P^*F_{BU}$ from the measurement.

Turning now to FIG. 1, a schematic block diagram 800 of a transient measurement in accordance with an embodiment of the present disclosure is shown. In this block diagram, the function denoted in each block corresponds to the impulse response of part of the system that the block represents. The passing of a signal through a block corresponds to convolution of the block input signals with the function in the block to produce the output signal. To simplify explanation, we assume a transmitter-receiver dipole moment product M to be unity.

Figure 8:
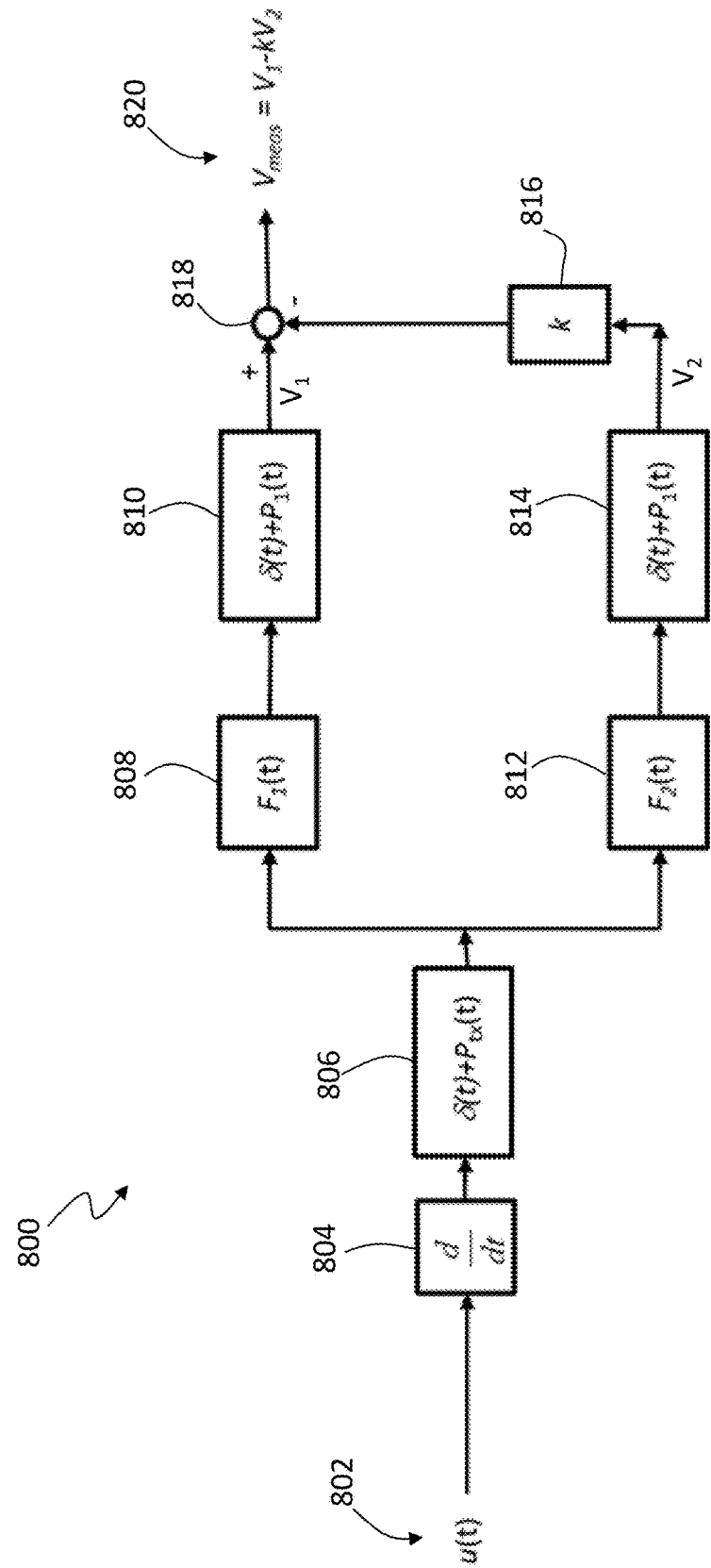
FIG. 8 is a schematic block diagram of a transient measurement process in accordance with an embodiment of the present disclosure.
Figure 9A:
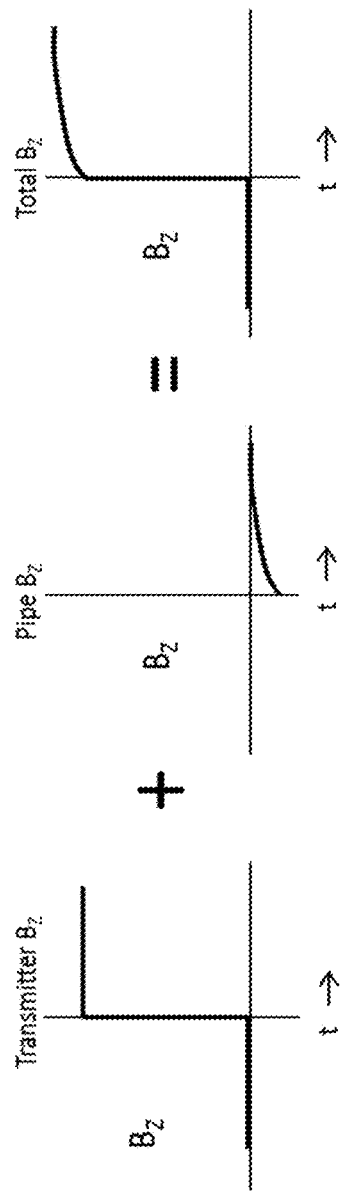
FIG. 9A is a schematic diagram showing the total magnetic moment from the vicinity of a transient electromagnetic sensor is the sum of a transmit field and a field from pipe currents.
Figure 9B:
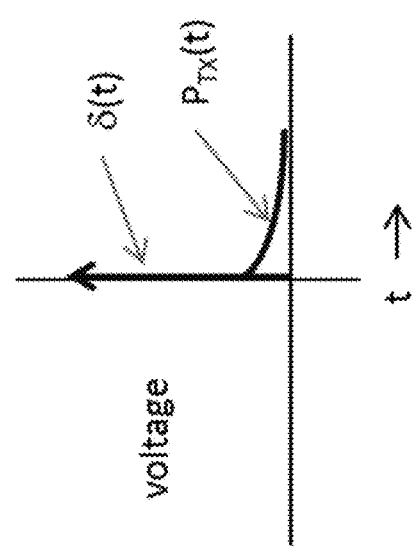
FIG. 9B is a schematic plot of a voltage referred impulse response of a transmitter and receiver to a step in a magnetic field.

A step change, shown as u(t), in a transmitter magnetic dipole is the input 802. The derivative block 804, d/dt, serves to reference the following or subsequent blocks to receiver voltages, e.g., reference a transmitter voltage response 806 to a receiver voltage. In FIG. 8, block 808 is a main receiver formation impulse response and block 810 is the associated main receiver impulse response. Block 812 is a bucking receiver formation impulse response, block 814 is the associated bucking receiver impulse response, and block 816 is the bucking coefficient. From the derivative of the transmitter and receiver B-field step responses (graphically shown in FIG. 9A), the response can be differentiated to produce an idealized impulse response for the transmitter and receivers as an impulse plus pipe response as shown in FIG. 9B. The transmitter response (block 806) and receiver responses (blocks 810, 814) of FIG. 8 reflect this. In FIG. 8, and as noted above, the pipe responses of the two receivers is assumed to be equal and is designated by a single variable $P_1$.

The block diagram 800 of FIG. 8 implements the transient measurement of Eq. (8). As previously noted, the measurement consists of the desired measurement $F_{BU}$ and the error term $P^*F_{BU}$.

As provided herein, embodiments of the present disclosure employ a feedback control system to drive the pipe signal to zero and suppress the error term in the transient measurement. That is, an auxiliary transmitter is configured on the system with the primary transmitter and the auxiliary transmitter is driven to generate a pipe suppression signal, e.g., perform active pipe compensation (see, FIG. 6).

To implement active pipe compensation, the second or auxiliary compensation coils are added to the primary transmitter, as shown in FIG. 6 (e.g., first transmitter 622A and second transmitter 622B, respectively). Using a feedback control system, the coils of the second transmitter 622B are driven by currents that produce a time varying magnetic moment that suppresses the pipe signal at the receiver coil terminals.

Figure 10:
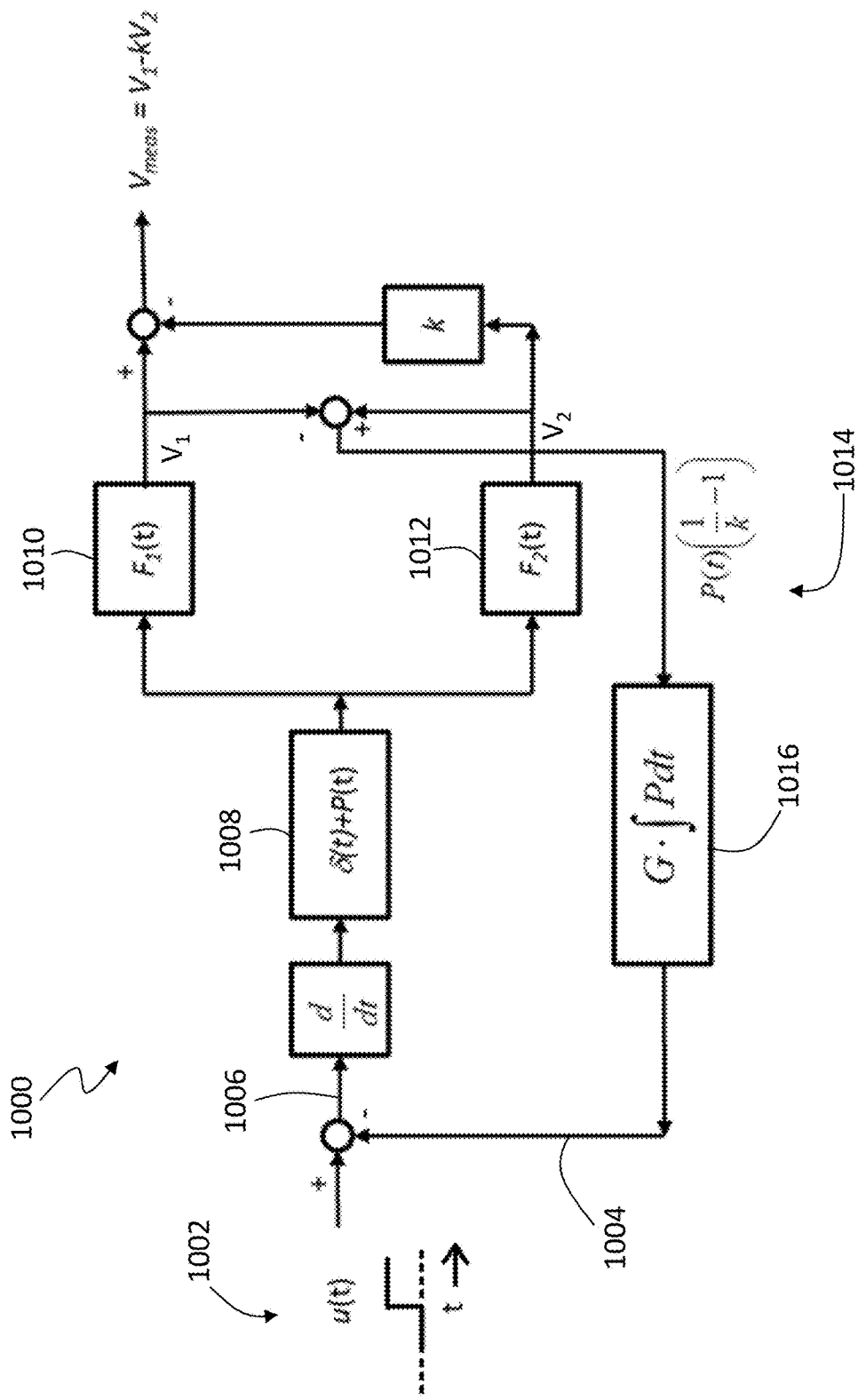
FIG. 10 is a schematic block diagram showing combined pipe signals and a feedback control system in accordance with an embodiment of the present disclosure.

For example, turning now to FIG. 10, a block diagram 1000 with a feedback control system in accordance with an embodiment of the present disclosure is shown. Using block diagram algebra, all the pipe signals are combined into a single block with labeled combined pipe response. The block diagram 1000 can be carried out using one or more controllers and/or processors that are in operable communication and/or control with a main transmitter, and auxiliary transmitters, a main receiver, and a bucking receiver.

As shown, a main transmitter input 1002 is provided and generated within a system similar to that shown in FIG. 6. The main transmitter input 1002 is a signal that is configured to generate a response in a formation such that one or more formation properties can be extracted from received signals at the main and bucking receivers. Also shown is an auxiliary transmitter current 1004. The main transmitter input 1002 and the auxiliary transmitter current 1004 are combined to generate a transmitted moment 1006. The combined pipe response 1008 is used to determine a main receiver formation response $F_1(t)$ and a bucking receiver formation response $F_2(t)$ (similar to FIG. 8). However, in the block diagram 1000 a feedback circuit 1014 is processed to generate the auxiliary transmitter current 1004 (e.g., pipe compensation signal), similar to the process described above.

Using the measurement method and mathematical models provided herein, the combined pipe signal is measured by bucking out the formation signal. This pipe signal measurement can be derived by subtracting $V_1$ from $V_2$ as shown in FIG. 10. This operation is performed by subtracting Eq. (3) from Eq. (2) and solving for pipe signal P(t) in terms of $V_2 - V_1$. The measured pipe signal is fed back through a feedback function 1016, shown in FIG. 10 as a gain G and a time integration of the measured pipe signal P. The feedback function 1016 converts the measured pipe signal into an error term that is used to drive the current in the coils of the auxiliary transmitter.

The process of block diagram 1000 can be achieved in multiple ways. For example, a closed-loop feedback mode can be used. In this method of operation, the control system is operated as shown in FIG. 10. The pipe signal is measured and directly fed back to suppress the pipe signal using the active auxiliary transmitter. Alternatively, for example, an open-loop operation can be used. In the open-loop mode of operation, the pipe signal is measured and recorded and used to drive the feedback function during measurement. The pipe signal can be measured using an air-hang test (e.g., not downhole). Alternately, the auxiliary transmitter currents can be recorded during closed-loop pipe suppression in a high resistivity formation. During normal operation, the recorded currents can be used to the drive the auxiliary transmitter without using the feedback circuit 1014.

As will be appreciated by those of skill in the art, the coil of the auxiliary transmitter should be designed with low enough inductance to accommodate the required derivative of the coil current. The generated compensation waveform, in accordance with embodiments of the present disclosure, is slow changing and has low bandwidth, thus minimizing any issues related to inductance in the auxiliary transmitter. Further, it is noted that the feedback control system is designed carefully in accordance with control system design theory to derive a feedback function that produces stable control without oscillation and ringing, or adverse reaction to measurement noise.

An example, employing a downhole tool having a configuration in accordance with embodiments of the present disclosure will be discussed with respect to FIGS. 11A-11D.

Figure 11A:
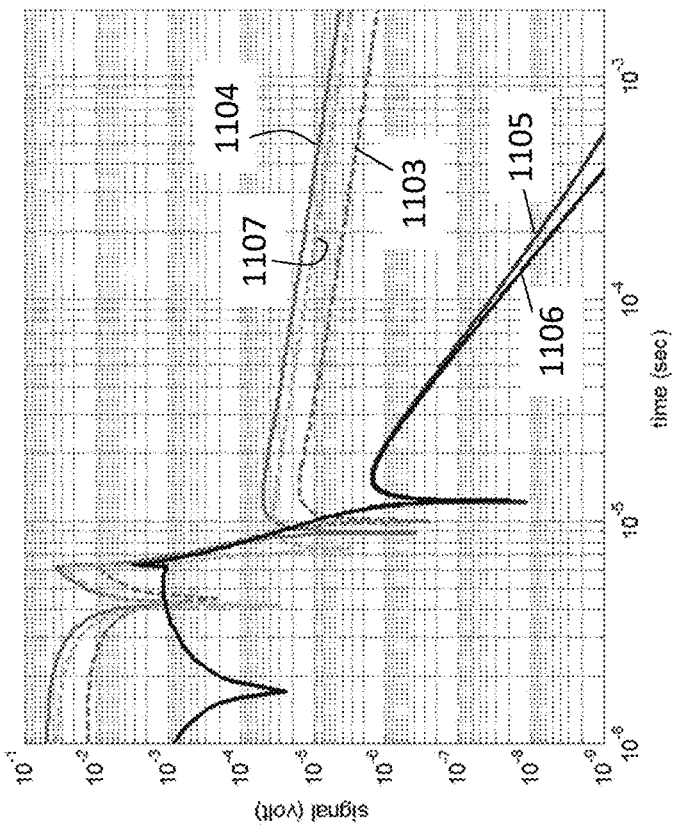
FIG. 11A is an illustrative plot of cumulative transmitter and pipe signals referenced to transmitter dipole for a system not having an auxiliary transmitter as provided herein.

FIG. 11A shows a plot of a cumulative transmitter and pipe signal for a transient electromagnetic tool without an auxiliary transmitter. The pipe signal at the transmitter (curve 1101) is 6% of the transmitter step moment at 1 ms and the pipe signal at the receiver (curve 1102) is 14% of the transmitter step moment at 1 ms. In FIG. 11A, cumulative transmitter and pipe signals referenced to a transmitter dipole are shown, with no auxiliary transmitter and 20 ft/30 ft receiver spacings on the downhole tool. That is, for example, $D_1$ is 30 feet and $D_2$ is 20 feet (as shown in FIG. 4).

Figure 11B:
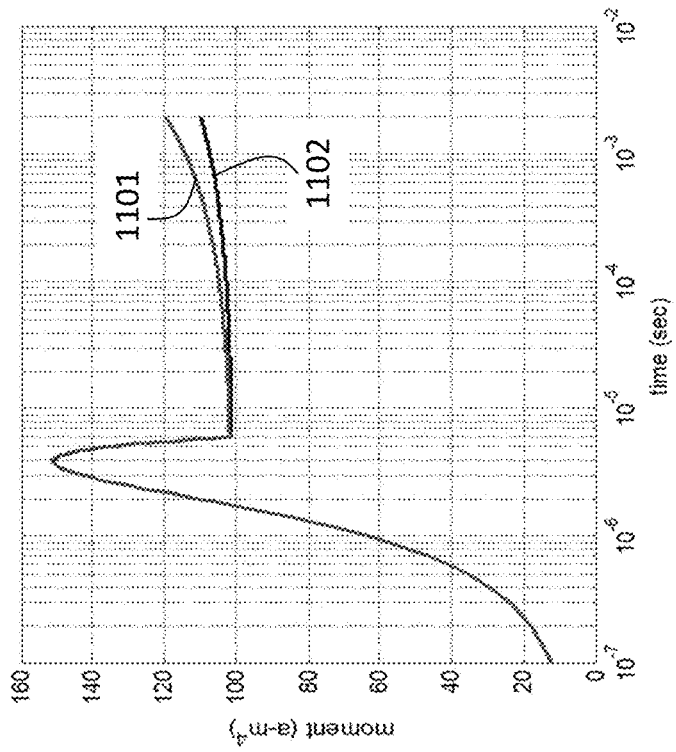
FIG. 11B is an illustrative plot of receiver voltages and measured signals for the system of FIG. 11A.

FIG. 11B shows an uncontrolled response of the transient electromagnetic tool without an auxiliary transmitter (e.g., the tool of FIG. 11A), for a homogeneous formation of 100 Ω-m resistivity. The main receiver response is shown as curve 1103 and the bucking receiver response is shown as curve 1104. A measured bucked response is shown as curve 1105, while an ideal bucked dipole response is shown as curve 1106, and curve 1107 shows a bucked pipe signal. As shown, a receiver response (curves 1103, 1104) is 2.5 decades greater than the bucked response 1105 at 200 microseconds, which may lead to errors from inaccuracies in estimation of the bucking coefficient. The measured curve (curve 1105) shows a significant deviation from the bucked dipole response (1104), indicating a significant error caused by formation response to the pipe signal.

Figure 11D:
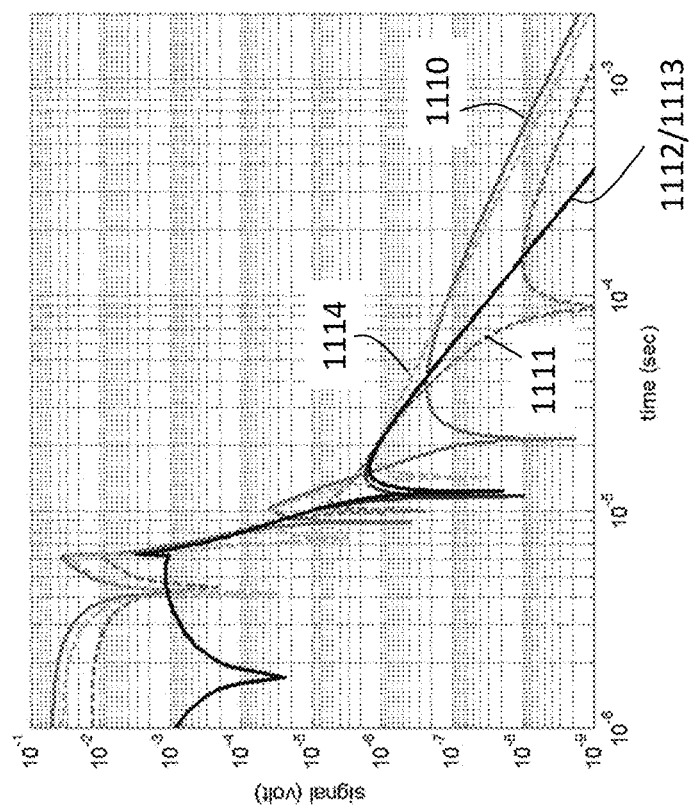
FIG. 11D is an illustrative plot of measurements of signals after applying feedback control and generating pipe compensation/suppression signals in accordance with an embodiment of the present disclosure.
Figure 11C:
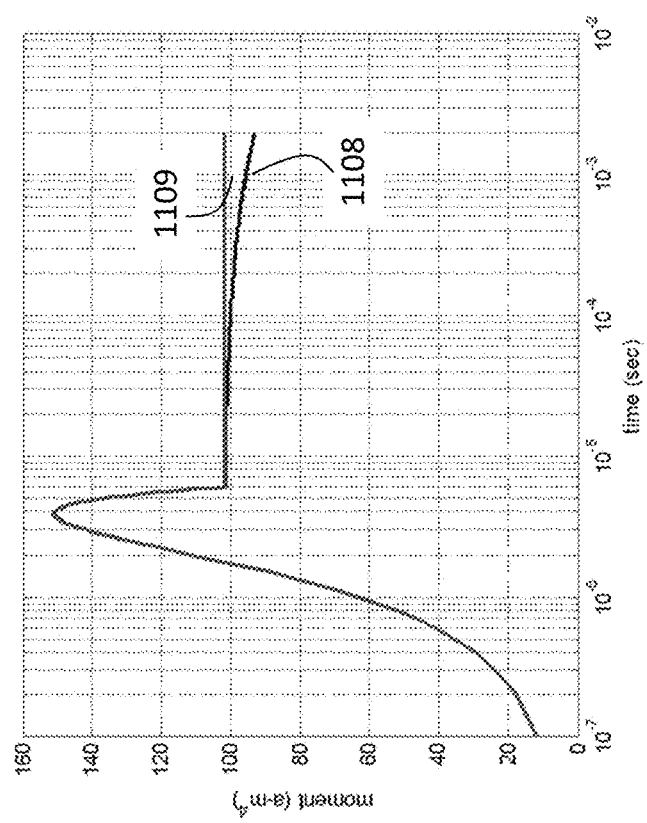
FIG. 11C is an illustrative plot of cumulative transmitter and pipe signals after applying closed loop feedback in accordance with an embodiment of the present disclosure.

Turning now to FIG. 11C, cumulative transmitter and pipe signals after applying a closed loop feedback and auxiliary transmitter in accordance with the present disclosure are shown. FIG. 11C shows the cumulative transmitter (curve 1108) and receiver signals (curve 1109) when active suppression in accordance with the present disclosure is used. As shown, the receiver response (curve 1109) is flat after an initial step, indicating that the pipe signal is suppressed at the receiver. Curve 1108 corresponds to the dipole moment at the transmitter. The moment after the initial step is decreasing, showing that the auxiliary transmitter overcompensates beyond the transmitter pipe signal in order to compensate for the transmitter and receiver combined.

FIG. 11D illustrates measurements of FIG. 11A after applying feedback control as provided herein. FIG. 11D shows the measured responses for the feedback control. The main receiver response is shown as curve 1111 and the bucking receiver response is shown as curve 1110. A measured bucked response is shown as curve 1112, while an ideal bucked dipole response is shown as curve 1113, and curve 1114 shows a bucked pipe signal. When compared to the curves of FIG. 11B, the pipe signal 1114 is suppressed by about two decades. The measured bucked formation curve 1112 now overlays the ideal bucked dipole curve 1113, showing elimination of formation response to pipe signal.

Figure 12:
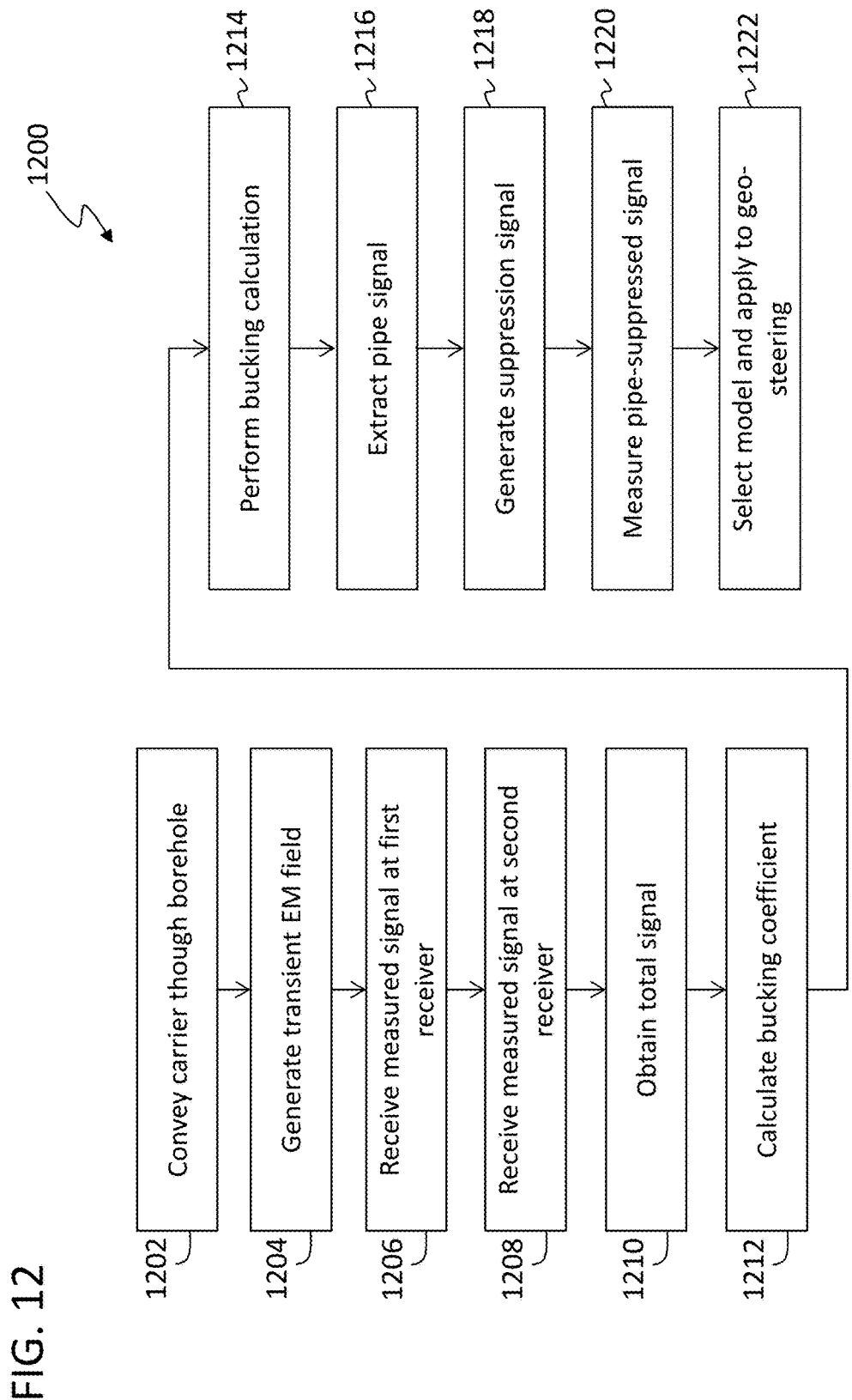
FIG. 12 is a flow process for estimating a property of an earth formation penetrated by a borehole in accordance with an embodiment of the present disclosure.

Turning now to FIG. 12, a flow process in accordance with an embodiment of the present disclosure is shown. The flow process 1200 can be used to generate a pipe compensation signal (e.g., use a pipe signal to generate a compensation pipe signal) using an auxiliary transmitter configured with a main transmitter. The flow process 1200 can be performed downhole with a main transmitter, an auxiliary transmitter, and two associated receivers located at first and second distances from the main transmitter. The flow process 1200 is used to generate a real-time or in situ pipe compensation signal that cancels a pipe signal received at the receivers and thus an accurate representation or estimate of formation properties can be obtained. Further, because the process 1200 can be performed in situ any changes in a pipe signal due to bending, temperature, and/or other variables that can affect pipe resistivity and/or conductivity downhole do not affect the cancellation of the pipe signal.

At block 1202, a carrier having a tool is conveyed downhole. Conveying the carrier and tool can be performed in any of known processes. Further, the carrier can be part of a wireline tool or part of a drill string, or other downhole conveyance structure, without departing from the scope of the present disclosure. In one embodiment, the tool is configured on a drill string and the process 1200 is used to adjust and/or modify a drilling operation such as to apply geo-steering to the drilling operation in response to detected and/or estimated formation properties. The tool includes a main transmitter, an auxiliary transmitter, a main receiver, and a bucking receiver (e.g., as shown in FIGS. 4, 6).

At block 1204, the transmitter is used to generate a transient electromagnetic field downhole. The generated transient electromagnetic field will induce a response in the formation that is around the transmitter and also in the carrier that the transmitter is configured on.

At block 1206, a measured signal will be detected at a first receiver. The first receiver may be a main receiver. Similarly, at block 1208, a measured signal will be detected at a second receiver. The second receiver may be a bucking receiver. As will be appreciated by those of skill in the art, the two signals of block 1206, 1208 will be slightly different, and thus the two signals can be used to extract out certain features of the signals.

At block 1210, between the two signals received at blocks 1206, 1208, a total signal is obtained. The total signal is the signal received by the receivers, with the signal including both responses from the formation and the pipe. Because the pipe signal can impact formation estimates and approximations adversely, it is advantageous to suppress the pipe signal from the total signal.

Accordingly, at block 1212 a bucking coefficient is calculated. The bucking coefficient can be calculated as a cube of the ratio of the receiver-to-transmitter distances. For example, Eq. (4) described above can be used to calculate the bucking coefficient k. In other embodiments, the bucking coefficient can be obtained through other methods or processes as known in the art. For example, in some non-limiting embodiments, the bucking coefficient can be obtained or measured experimentally.

Knowing the signals at the first and second receivers and the bucking coefficient k, a bucking calculation can be performed at block 1214. The bucking calculation of block 1214 employs Eqs. (5), as described above.

From the bucking calculation of block 1214, a pipe signal can be extracted from the downhole measurements, the bucking coefficient k, and the bucking calculation at block 1216. Thus, an in situ calculation of the pipe signal can be extracted. At block 1218, the extracted pipe signal is operationally saved and/or transmitted to the surface (and then saved). The extracted pipe signal can be saved or stored on memory that is part of a geo-steering system that controls operation of a drill to which the tool is connected.

Once the pipe signal is extracted at block 1216, the downhole tool can be configured to generate a suppression signal based on the extracted pipe signal (e.g., using the auxiliary transmitter), as shown at block 1218. The first or main transmitter is used to generate the total signal, from which the pipe signal is extracted, and then the second or auxiliary transmitter is configured to transmit the suppression signal that is configured to cancel, suppress, or otherwise minimize or eliminate the pipe signal from the total signal.

Thus, as shown at block 1220, a pipe-suppressed signal can be detected or measured by the receivers wherein the pipe signal is suppressed. The pipe-suppressed signal can then be used to select a model and geo-steering can be appropriately adjusted (e.g., the pipe-suppressed signal can be saved, stored, processed, etc. to enable improved formation estimation and geo-steering) as shown at block 1222.

Embodiments provided herein enable significant steps in the development of downhole transient electromagnetic tools. When implemented, embodiments as described herein provide various advantages. For example, active suppression of pipe signals allows reduction of the tool length to a single subassembly, e.g., 20 to 25 feet in length. Reductions in tool length can eliminate challenging problems associated with time synchronization of the transmitter to receiver(s) when the components are located on separate subassemblies. Further, active suppression of the pipe signal, as provided herein, can eliminate the need for correction of measured signals during or before inversion. That is, due to active pipe suppression, otherwise required mathematical processes may be minimized and/or eliminated entirely. Moreover, active suppression of the pipe signal can reduce a difference in magnitude between received signals and bucked signals. This makes bucking computations much less sensitive to errors in the estimation of the bucking coefficient.

In accordance with some embodiments, the formation property obtained through the above described processes is a resistivity of an earth formation such that an operator may make informed decisions regarding geo-steering. Accordingly, embodiments provided herein may improve downhole operations, including but not limited to, improving efficiencies in measurement-while-drilling operations.

In sum, in accordance with embodiments provided herein, a method and/or process for determining a resistivity property of an earth formation (or other properties) is provided. The process includes producing a transient electromagnetic signal using an auxiliary transmitter on a carrier downhole (or in situ) or on the surface during an air test. Using two receivers on the carrier, downhole, a detected signal is affected by a finite, non-zero conductivity of the carrier. A bucking coefficient k can be calculated using a processor, with the bucking coefficient based on a ratio of distances between the receivers and the transmitter, or the bucking coefficient can be measured experimentally. Knowing a current total signal and the bucking coefficient, a bucking calculation can be performed to extract a pipe signal from the total signal. The pipe signal can then be generated as a suppression signal from the auxiliary transmitter, thus eliminating or significantly reducing the pipe signal from the total signal, to obtain an accurate representation of the downhole formation.

Set forth below are some embodiments of the foregoing disclosure:

Embodiment 1

A method for estimating a property of an earth formation penetrated by a borehole, the method comprising: conveying a carrier through a borehole, the carrier having a first transmitter, a second transmitter collocated with the first transmitter, a first receiver, and a second receiver, the first receiver being positioned at a first distance from the first transmitter and the second receiver being positioned at a second distance from the first transmitter; generating a transient electromagnetic field with the first transmitter; generating a suppression signal with the second transmitter, the suppression signal configured to suppress a response received by the first receiver and the second receiver that is caused by the transient electromagnetic field interacting with the carrier; measuring a signal with suppressed pipe signal at the first receiver and signal with suppressed pipe signal at the second receiver, the measured signal representing the formation response to the transient electromagnetic field; estimating a formation property from the measured signal to select a model of the formation; and adjusting a drilling operation based on the estimated property of the formation.

Embodiment 2

The method of embodiment 1, further comprising: receiving a first measured signal at the first receiver due to the transient electromagnetic field; receiving a second measured signal at the second receiver due to the transient electromagnetic field; obtaining a total signal from the first measured signal and the second measured signal; calculating a bucking coefficient k based on a ratio of the second distance to the first distance; and performing a bucking calculation employing the bucking coefficient k, the first measured signal, and the second measured signal to extract a pipe signal.

Embodiment 3

The method of embodiment 2, wherein the bucking coefficient $$k = \left(\frac{d_2}{d_1}\right)^3.$$

Embodiment 4

The method of embodiment 2, wherein the bucking calculation comprises $V_1 - kV_2 = M[F_1(t) - kF_2(t)] + MP*[F_1(t) - kF_2(t)]$, wherein V1 is a voltage at the first receiver, V2 is a voltage at the second receiver, M is a transmitter-receiver moment product, P is the pipe signal, and F1 and F2 are the responses to the formation.

Embodiment 5

The method of embodiment 1, wherein the first transmitter is a main transmitter, the second transmitter is an auxiliary transmitter, the first receiver is a main receiver, and the second receiver is a bucking receiver.

Embodiment 6

The method of embodiment 5, wherein the main transmitter, the auxiliary transmitter, the main receiver, and the bucking receiver are all configured on a single subassembly.

Embodiment 7

The method of embodiment 1, wherein the property of the formation is a resistivity of the formation.

Embodiment 8

The method of embodiment 1, wherein the carrier further comprises a controller configured to receive information from the first receiver and the second receiver and further configured to drive the second transmitter to generate the suppression signal.

Embodiment 9

The method of embodiment 1, further comprising performing a feedback loop to determine the suppression signal.

Embodiment 10

The method of embodiment 1, further comprising: receiving a first measured signal at the first receiver due to the transient electromagnetic field; receiving a second measured signal at the second receiver due to the transient electromagnetic field; obtaining a total signal from the first measured signal and the second measured signal; calculating a bucking coefficient k from experimental measurements; and performing a bucking calculation employing the bucking coefficient k, the first measured signal, and the second measured signal to extract a pipe signal.

Embodiment 11

A system for estimating a property of an earth formation penetrated by a borehole, the system comprising: a carrier configured to be conveyed through a borehole; a first transmitter disposed on the carrier and configured to transmit transient electromagnetic fields; a second transmitter disposed on the carrier and configured to transmit suppression signals; a first receiver disposed on the carrier a first distance from the first transmitter and configured to receive signals from the first transmitter and the second transmitter; a second receiver disposed on the carrier a second distance from the first transmitter and configured to receive signals from the first transmitter; and a processor configured to estimate a property of the formation, the system configured to: generate a transient electromagnetic field with the first transmitter; generate a suppression signal with the second transmitter, the suppression signal configured to suppress a response received by the first receiver and the second receiver that is caused by the transient electromagnetic field interacting with the carrier; measure a signal with suppressed pipe signal at the first receiver and signal with suppressed pipe signal at the second receiver, the measured signal representing the formation response to the transient electromagnetic field; and estimate a formation property from the measured signal to select a model of the formation.

Embodiment 12

The system of embodiment 11, the processor further configured to adjust a drilling operation based on the estimated property of the formation.

Embodiment 13

The system of embodiment 11, the processor further configured to: receive a first measured signal at the first receiver due to the transient electromagnetic field; receive a second measured signal at the second receiver due to the transient electromagnetic field; obtain a total signal from the first measured signal and the second measured signal; calculate a bucking coefficient k based on a ratio of the second distance to the first distance; and perform a bucking calculation employing the bucking coefficient k, the first measured signal, and the second measured signal to extract a pipe signal.

Embodiment 14

The system of embodiment 13, wherein the bucking coefficient $$k = \left(\frac{d_2}{d_1}\right)^3.$$

Embodiment 15

The system of embodiment 13, wherein the bucking calculation comprises $V_1-kV_2=M[F_1(t)-kF_2(t)]+MP*[F_1(t)-kF_2(t)]$, wherein V1 is a voltage at the first receiver, V2 is a voltage at the second receiver, M is a transmitter-receiver moment product, P is the pipe signal, and F1 and F2 are the responses to the formation.

Embodiment 16

The system of embodiment 11, wherein the first transmitter is a main transmitter, the second transmitter is an auxiliary transmitter, the first receiver is a main receiver, and the second receiver is a bucking receiver.

Embodiment 17

The system of embodiment 16, wherein the main transmitter, the auxiliary transmitter, the main receiver, and the bucking receiver are all configured on a single subassembly.

Embodiment 18

The system of embodiment 11, wherein the property of the formation is a resistivity of the formation.

Embodiment 19

The system of embodiment 11, wherein the carrier further comprises a controller configured to receive information from the first receiver and the second receiver and further configured to drive the second transmitter to generate the suppression signal.

Embodiment 20

The system of embodiment 11, the processor further configured to perform a feedback loop to determine the suppression signal.

Embodiment 21

The system of embodiment 11, the processor further configured to: receive a first measured signal at the first receiver due to the transient electromagnetic field; receive a second measured signal at the second receiver due to the transient electromagnetic field; obtain a total signal from the first measured signal and the second measured signal; calculate a bucking coefficient k from experimental measurements; and perform a bucking calculation employing the bucking coefficient k, the first measured signal, and the second measured signal to extract a pipe signal.

The systems and methods described herein provide various advantages. For example, various embodiments provided herein may provide improved and/or efficient processes for estimating a formation property. Such efficient and improved estimation may be made in improved timeframes (and in situ), thus enabling an operator to make informed decisions regarding drilling and/or other downhole operations, and make adjustments thereto, as needed. Further advantages of various embodiments may include providing a very fast and accurate estimation of formation properties as compared to prior processes for making similar estimations.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first" and "second" do not denote a particular order, but are used to distinguish different elements.

The flow diagram depicted herein is just an example. There may be many variations to this diagram or the steps (or operations) described therein without departing from the scope of the present disclosure. For instance, the steps may be performed in a differing order, or steps may be added, deleted or modified. All of these variations are considered a part of the present disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

What is claimed is:

1. A method for estimating a property of an earth formation penetrated by a borehole, the method comprising:
    conveying a carrier through a borehole, the carrier having a first transmitter, a second transmitter collocated with the first transmitter, a first receiver, and a second receiver, the first receiver being positioned at a first distance ($d_1$) from the first transmitter and the second receiver being positioned at a second distance ($d_2$) from the first transmitter;
    generating a transient electromagnetic field with the first transmitter;
    generating a suppression signal with the second transmitter, the suppression signal configured to suppress a response received by the first receiver and the second receiver that is caused by the transient electromagnetic field interacting with the carrier;

measuring a signal having a formation response to the transient electromagnetic field and the suppression signal at the first receiver and a signal having a formation response to the transient electromagnetic field and the suppression signal at the second receiver, the measured signals representing the formation response to the transient electromagnetic field;

estimating a formation property from the measured signals to select a model of the formation; and adjusting a drilling operation based on the estimated property of the formation.

2. The method of claim 1, further comprising:
receiving a first measured signal at the first receiver due to the transient electromagnetic field;
receiving a second measured signal at the second receiver due to the transient electromagnetic field;
obtaining a total signal from the first measured signal and the second measured signal;
calculating a bucking coefficient k based on a ratio of the second distance to the first distance; and
performing a bucking calculation employing the bucking coefficient k, the first measured signal, and the second measured signal to extract a pipe signal.

3. The method of claim 2, wherein the bucking coefficient $$k = \left(\frac{d_2}{d_1}\right)^3.$$

4. The method of claim 2, wherein the bucking calculation comprises $V_1=kV_2=M[F_1(t)-kF_2(t)]+MP^*[F_1(t)-kF_2]$, (wherein $V_1$ is a voltage at the first receiver, $V_2$ is a voltage at the second receiver, M is a transmitter-receiver moment product, P is the pipe signal, and $F_1$ and $F_2$ are the responses to the formation.

5. The method of claim 1, wherein the first transmitter is a main transmitter, the second transmitter is an auxiliary transmitter, the first receiver is a main receiver, and the second receiver is a bucking receiver.

6. The method of claim 5, wherein the main transmitter, the auxiliary transmitter, the main receiver, and the bucking receiver are all configured on a single subassembly.

7. The method of claim 1, wherein the property of the formation is a resistivity of the formation.

8. The method of claim 1, wherein the carrier further comprises a controller configured to receive information from the first receiver and the second receiver and further configured to drive the second transmitter to generate the suppression signal.

9. The method of claim 1, further comprising performing a feedback loop to determine the suppression signal.

10. The method of claim 1, further comprising:
receiving a first measured signal at the first receiver due to the transient electromagnetic field;
receiving a second measured signal at the second receiver due to the transient electromagnetic field;
obtaining a total signal from the first measured signal and the second measured signal;
calculating a bucking coefficient k from experimental measurements; and
performing a bucking calculation employing the bucking coefficient k, the first measured signal, and the second measured signal to extract a pipe signal.

11. A system for estimating a property of an earth formation penetrated by a borehole, the system comprising:
a carrier configured to be conveyed through a borehole;
a first transmitter disposed on the carrier and configured to transmit transient electromagnetic fields;
a second transmitter disposed on the carrier and configured to transmit suppression signals;
a first receiver disposed on the carrier a first distance ($d_1$) from the first transmitter and configured to receive signals from the first transmitter and the second transmitter;
a second receiver disposed on the carrier a second distance ($d_2$) from the first transmitter and configured to receive signals from the first transmitter; and
a processor configured to estimate a property of the formation, the system configured to:
generate a transient electromagnetic field with the first transmitter;
generate a suppression signal with the second transmitter, the suppression signal configured to suppress a response received by the first receiver and the second receiver that is caused by the transient electromagnetic field interacting with the carrier;
measure a signal having a formation response to the transient electromagnetic field and a suppression signal at the first receiver and a signal having a formation response to the transient electromagnetic field and a suppression signal at the second receiver, the measured signals representing the formation response to the transient electromagnetic field; and
estimate a formation property from the measured signals to select a model of the formation.

12. The system of claim 11, the processor further configured to adjust a drilling operation based on the estimated property of the formation.

13. The system of claim 11, the processor further configured to:
receive a first measured signal at the first receiver due to the transient electromagnetic field;
receive a second measured signal at the second receiver due to the transient electromagnetic field;
obtain a total signal from the first measured signal and the second measured signal;
calculate a bucking coefficient k based on a ratio of the second distance to the first distance; and
perform a bucking calculation employing the bucking coefficient k, the first measured signal, and the second measured signal to extract a pipe signal.

14. The system of claim 13, wherein the bucking coefficient $$k = \left(\frac{d_2}{d_1}\right)^3.$$

15. The system of claim 13, wherein the bucking calculation comprises $V_1-kV_2=M[F_1(t)-kF_2(t)]+MP^*[F_1(t)-kF_2(t)]$, wherein $V_1$ is a voltage at the first receiver, $V_2$ is a voltage at the second receiver, M is a transmitter-receiver moment product, P is the pipe signal, and $F_1$ and $F_2$ are the responses to the formation.

16. The system of claim 11, wherein the first transmitter is a main transmitter, the second transmitter is an auxiliary transmitter, the first receiver is a main receiver, and the second receiver is a bucking receiver.

17. The system of claim 16, wherein the main transmitter, the auxiliary transmitter, the main receiver, and the bucking receiver are all configured on a single subassembly.

18. The system of claim 11, wherein the property of the formation is a resistivity of the formation.

19. The system of claim 11, wherein the carrier further comprises a controller configured to receive information from the first receiver and the second receiver and further configured to drive the second transmitter to generate the suppression signal.

20. The system of claim 11, the processor further configured to perform a feedback loop to determine the suppression signal.

21. The system of claim 11, the processor further configured to:
- receive a first measured signal at the first receiver due to the transient electromagnetic field;
- receive a second measured signal at the second receiver due to the transient electromagnetic field;
- obtain a total signal from the first measured signal and the second measured signal;
- calculate a bucking coefficient k from experimental measurements; and
- perform a bucking calculation employing the bucking coefficient k, the first measured signal, and the second measured signal to extract a pipe signal.

* * * * *